Figure 1:
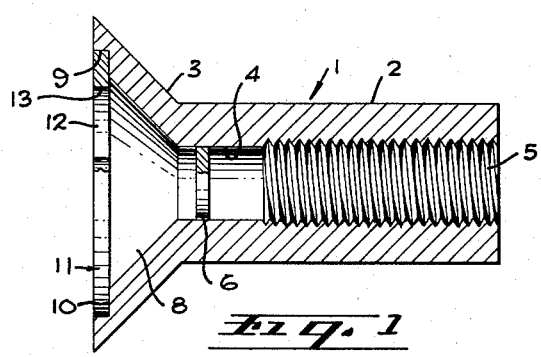

April 13, 1965  B. S. SAUTER  3,177,754

FASTENER DRIVING SOCKET ARRANGEMENT

Filed April 2, 1962

BOBBIE S. SAUTER
INVENTOR.

BY Richard F. Carr

ATTORNEY

United States Patent Office 3,177,754
Patented Apr. 13, 1965

3,177,754
FASTENER DRIVING SOCKET ARRANGEMENT
Bobbie S. Sauter, Woodland Hills, Calif., assignor to Deutsch Fastener Corp., Los Angeles, Calif., a corporation of California
Filed Apr. 2, 1962, Ser. No. 184,302
1 Claim. (Cl. 85—32)

This invention pertains to a recess for driving a bolt or screw by means of a rotary tool.

Problems encountered with driving threaded fasteners have resulted in the creation of a multitude of designs for recesses to be used in rotating the fasteners. A continual difficulty is in devising a fastener which can be given a high driving torque without damage to the recess or the driving tool. Often the driver will tend to ride out of the socket as the rotating force is applied. In other designs the material of the fastener becomes damaged during the driving operation preventing reuse. In some situations the fastener may not be capable of reverse movement for removing the fastener subsequent to installation.

Another kind of difficulty is encountered with fasteners of the internally threaded type. For example, certain types of stressed panel fasteners may include a nut having a driving socket in one end and a threaded bore at the other, for association with a stud or bolt. In the mass production of the nuts for such fasteners often it is not practical to attempt to stop the axial movement of the tool used in forming the threaded bore short of the end of the fastener. In other words, the cutting tool may be caused to extend entirely through the bore, thereby removing the portion of the fastener at the head where the driving recess is to be provided. As a result for fasteners of this type, it has been extremely difficult to provide any satisfactory type of driving socket where the nut elements are produced in volume.

According to the provisions of this invention the driving socket includes a separate element which is attached to the remainder of the fastener. This may be, for example, a flat disc provided with an appropriate driving slot secured to the head end of the fastener in engagement with a shoulder and adjacent a clearance opening beneath the disc. In another form of the invention the disc may be somewhat cup-shaped extending down into the opening within the fastener. The separate element having the driving socket may be held in place by brazing, bonding, welding, or other suitable arrangements. With such a design the fact that the bore extends entirely through the fastener, including the head portion, does not have any adverse effect because the piece containing the driving slot is applied subsequently. Additionally, with this separate element and the clearance opening beneath it, driving tools may be devised having undercut arrangements or other appropriate configurations to increase the ability of the fastener to absorb the driving torque. Thus, the invention is not limited to fasteners having a hollow interior but may be used to advantage for any device to be installed by rotation. Added advantages are found in the low cost of production of the design of this invention avoiding the complicated procedures often resorted to in imparting slot contours within the head of a fastener.

Therefore, it is an object of this invention to provide a fastener having a driving slot incorporated in a separate element attached to the fastener member.

Another object of this invention is to provide a fastener in which a driving slot may be applied to an element having a bore extending entirely therethrough.

A further object of this invention is to provide an arrangement for driving a fastener that permits the application of high driving torques in either direction.

Yet another object of this invention is to provide a fastener of low cost, yet durable construction, adapted for mass production techniques.

Figure 2:
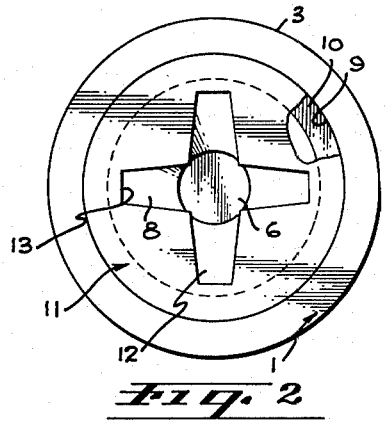
Figure 3:
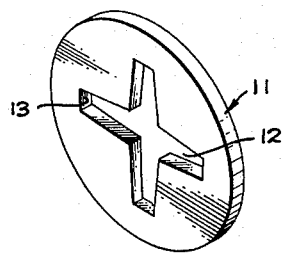
Figure 5:
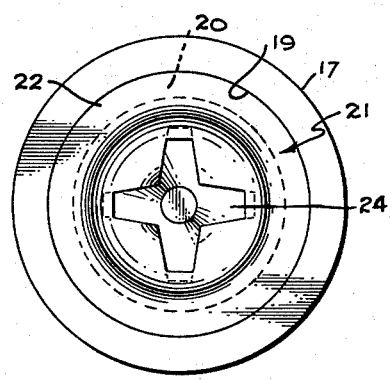
Figure 4:
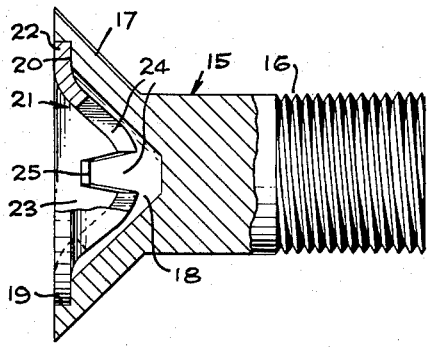

These and other objects will become apparent from the following detailed description taken in connection with the accompanying drawing in which:

FIG. 1 is a longitudinal sectional view of a fastener embodying the screw driving arrangement of this invention, FIG. 2 is an end elevational view of the fastener of FIG. 1, FIG. 3 is a perspective view of the separate disc having the driving aperture, with the disc removed from the remaining portions of the fastener, FIG. 4 is a longitudinal sectional view, partially in elevation, of a different form of fastener and driving member, and FIG. 5 is an end elevational view of the fastener of FIG. 4.

With reference to the drawing, there may be seen in FIG. 1 a fastener 1 having an elongated shank 2 connecting to a head 3 of frustoconical shape for flush installation. The member 1 also includes a central bore 4 extending the length of this element, with internal threads 5 being provided at the end portion of the shank remote from the head 3. Thus, the fastener element 1 is adapted for use as a nut for engagement with a threaded stud or bolt. A disc 6 in the bore 4 adjacent the head 3 plugs the bore and prevents entry of foreign matter into the threaded portion of the fastener.

According to the provisions of this invention, there is included an enlarged opening 8 in the head portion 3 of the fastener. In addition, at the outer radial face of the head there is a relatively short cylindrical recess 9 defining a shoulder 10 where it connects to the opening 8. Within the cylindrical recess 9, in engagement with the shoulder 10 at its peripheral portions and flush with the radial face of the head, is a disc 11. The latter member provides the driving slot for the fastener 1. Therefore, the disc 11 includes an opening 12 of any appropriate configuration. In the design illustrated, the slot 12 is cruciform in contour but other shapes are equally usable. For example, the slot may be hexagonal, or may define an elongated rectangle, or be of other shape.

Normally the member 11 is secured in the recess section 9 by a furnace brazing process. Alternatively, it may be welded in place, bonded, soldered or otherwise suitably attached. It should be noted that with the disc received within the recess in the head 3 the outer edges 13 of the driving slot 12 are spaced slightly inwardly from the edges of shoulder 10. As a result, there is a clearance axially inward of all portions of the driving slot 12, permitting a driving bit to enter the slot and fully engage the edges thereof.

It can be seen, therefore, that by the design of this invention several advantages are realized. In forming the fastener element 1 there is no restriction in passing a tool entirely through the bore, thereby removing stock from within the head portion of the fastener. This is because a clearance area is provided in the fastener head, and the driving slot is formed in a separately attached member. In this manner, a true mass production of internally threaded fasteners can be achieved. It is a simple matter to form an accurate slot in a separate disc element, such as the member 11, avoiding the necessity of producing such a recess within the material of the head itself. Nevertheless, the separate disc member is readily attached to the recess within the head of the fastener and provides a durable arrangement. Furthermore, the clearance provided by the opening 8 beneath the slot 12 through the disc 11 allows the driving bit to achieve full engagement with the edges of the driving slot. It also permits the bit to be given an undercut configuration at its driving surfaces which can engage the disc on the inside surface at the edge portions of the slot. This means that where high driving torques are necessary, the driving bit can be retained in engagement with the recess within the fastener and will not tend to back out as with conventional designs.

The design of this invention is not limited to internally threaded fasteners, as with the previously described embodiment, but is applicable as well to other fasteners such as the bolt 15, shown in FIGS. 4 and 5. This fastener has a shank 16 which is externally threaded so that element 15 acts as a bolt or screw. Within the head 17, however, there is a recess 18 including a short cylindrical segment 19 of larger diameter comparable to the arrangement previously described. Again, a shoulder 20 is defined between the recess portions 18 and 19.

FIGS. 4 and 5 also illustrate a different form of insert for the driving slot. Here instead of being a flat element as the disc 11, the member 21 is somewhat cup-shaped in contour. It includes an outer radial flange 22 from which extends a curved central portion 23. The latter section of the driving member includes a slot 24, cruciform in the embodiment illustrated, but which again may be of any desired shape. It may be noted that the outer edges 25 of the slot 24 are spaced from the periphery of the opening 18. Therefore, there is a clearance for the driving tool to fully enter the slot and impart the rotative force along the edges of the driving recess.

It can be seen, therefore, that the design of this invention is versatile permitting a variety of shapes and types of driving recesses for an internally driven fastener. The separate member which is secured to the fastener may be flat, cup-shaped, conical or of other configuration.

The foregoing detailed description is to be clearly understood as given by way of illustration and example only, the spirit and scope of this invention being limited solely by the appended claim.

I claim:

A nut comprising a first member having a shank and a head at one end of said shank, said first member having a bore extending therethrough, portions of said bore having internal threads, said bore at said head including an enlarged portion adjacent the outer face of said head thereby defining a shoulder, a second member attached to said head of said first member, said second member being received in said bore and having peripheral portions engaging said shoulder, said second member having an aperture therethrough adapted to receive and engage a rotary driving tool, said second member being spaced from the surface of said bore axially inward of said aperture, and a third member, said third member being received in said bore inwardly of said second member and adjacent said internal threads, and sealingly engaging said bore to act as a plug for precluding foreign matter entering said bore at said head from entering said internal threads.

References Cited by the Examiner

UNITED STATES PATENTS

| 2,222,667 | 11/40 | Kitzelman | 85—45 |
| 2,331,608 | 10/43 | Hathorn | 85—45 |
| 2,672,659 | 3/54 | Becker | 85—32 |
| 2,931,265 | 4/60 | De Lacy | 85—45 |

EDWARD C. ALLEN, *Primary Examiner.*